(12) United States Patent
Sun

(10) Patent No.: US 11,059,161 B2
(45) Date of Patent: Jul. 13, 2021

(54) JOINT FIXING STRUCTURE OF HAND-HELD POWER TOOL

(71) Applicant: STORM PNEUMATIC TOOL CO., LTD., Taichung (TW)

(72) Inventor: Yung Yung Sun, Taichung (TW)

(73) Assignee: Storm Pneumatic Tool Co., Ltd., Taichung (TW)

( * ) Notice: Subject to any disclaimer, the term of this patent is extended or adjusted under 35 U.S.C. 154(b) by 479 days.

(21) Appl. No.: 16/215,142

(22) Filed: Dec. 10, 2018

(65) Prior Publication Data
US 2020/0180135 A1   Jun. 11, 2020

(51) Int. Cl.
   *B25F 5/02*   (2006.01)
   *F16C 11/06*  (2006.01)

(52) U.S. Cl.
   CPC ............. *B25F 5/02* (2013.01); *F16C 11/06* (2013.01)

(58) Field of Classification Search
   CPC .................................. B25F 5/02; F16C 11/06
   USPC ............ 403/77; 248/663, 481, 181.1, 288.31
   See application file for complete search history.

(56) References Cited

U.S. PATENT DOCUMENTS

| | | | | |
|---|---|---|---|---|
| 2,859,983 | A * | 11/1958 | May ....................... | F21V 19/02 285/90 |
| 3,149,863 | A * | 9/1964 | Melton ............... | F16C 11/0676 403/125 |
| 5,020,281 | A * | 6/1991 | Neff ..................... | B23D 47/126 30/388 |
| 8,414,202 | B2 * | 4/2013 | Li ......................... | F16M 11/14 396/428 |
| 8,979,055 | B2 * | 3/2015 | Chu ....................... | F16M 11/14 248/288.31 |
| 2018/0029215 | A1* | 2/2018 | Zhong ..................... | B25F 5/006 |
| 2018/0149192 | A1* | 5/2018 | Hosen ....................... | F16J 15/52 |
| 2019/0009399 | A1* | 1/2019 | Sun ........................ | B23D 45/16 |
| 2020/0180135 | A1* | 6/2020 | Sun ......................... | F16C 11/06 |

* cited by examiner

Primary Examiner — Muhammad Ijaz
(74) Attorney, Agent, or Firm — Thomas J. Nikolai; DeWitt LLP

(57) ABSTRACT

A joint fixing structure of a hand-held power tool includes a fixing base connected with a tool head. Two opposite sides of the fixing base have through holes with movable balls. The fixing base is surrounded by a C-shaped ring with two protrusions. The C-shaped ring is surrounded by a control ring that has an circular outer surface and an inner surface provided with two recesses. The control ring is operated to rotate relative to the C-shaped ring between an unlocked position and a locked position. When in the unlocked position, the protrusions go into the recesses, making the C-shaped ring not press the balls so that the tool head can be pivoted freely. When in the locked position, the tool head is locked by the balls being pressed by the deformation of the C-shaped ring due to the motion of the protrusions out of the recesses.

4 Claims, 7 Drawing Sheets

JOINT FIXING STRUCTURE OF HAND-HELD POWER TOOL

FIELD OF THE INVENTION

The present invention relates to a hand-held power tool, and more particularly to a joint fixing structure of a hand-held power tool.

BACKGROUND OF THE INVENTION

FIG. 9 shows a conventional hand-held power tool which may be a power tool or a pneumatic tool. The power tool has a main body 5. One end of the power tool is pivotally connected with a tool head 51. The tool head 51 can be adjusted and pivoted relative to the main body 5 to meet the working angle required when in use. One end of the main body 5, close to the tool head 51, is provided with a tightening ring 52. The tightening ring 52 is connected with a knob 53 that can be pulled and rotated. After the adjustment of the pivoting angle of the tool head 51 is completed, the knob 53 is operated to move in the direction of the main body 5, and the tightening ring 52 is pressed inwardly to retain the tool head 51 so that the tool head 51 is no longer pivoted to start working.

However, when the user operates the power tool, the user's palm grips the main body 5 and surrounds the knob 53 for stable operation. The knob 53 protrudes from the main body 5, which results in that the palm cannot be in close contact with the main body 5. Holding the raised knob 53 causes pain in the palm to affect the handling feel and lower the quality of work. In addition, the raised knob 53 is not aesthetically pleasing in the overall appearance of the power tool, and its complex shape causes inconsistencies. Accordingly, the inventor of the present invention has devoted himself based on his many years of practical experiences to solve these problems.

SUMMARY OF THE INVENTION

The present invention is to provide a joint fixing structure of a hand-held power tool, which has a simple arcuate configuration as a whole and does not have a structure that protrudes outward, so that the appearance is simple and beautiful.

In order to achieve the aforesaid object, a joint fixing structure of a hand-held power tool is provided. The hand-held power tool comprises a main body and a tool head. The main body is connected to the tool head through a flexible transmission shaft. The tool head is pivotable relative to the main body. The joint fixing structure comprises a plurality of annular grooves, a fixing base, a C-shaped ring, and a control ring. The annular grooves are disposed on a spherical seat of the tool head. The fixing base is embedded in the main body. The fixing base has a receiving room for receiving the spherical seat. The spherical seat is pivotable in the receiving room. Two opposite sides of the fixing base are provided with through holes. The through holes are provided with balls movable in the through holes. The C-shaped ring surrounds an outer periphery of the fixing base. An inner peripheral surface of the C-shaped ring is provided with press portions corresponding in position to the balls. An outer peripheral surface of the C-shaped ring is provided with protrusions corresponding in position to the press portions. One side of each of the protrusions has a first bevel. The protrusions are arranged symmetrically relative to a center of the C-shaped ring. The control ring has an outer annular surface in a circular shape. The control ring has an inner annular surface surrounding the outer peripheral surface of the C-shaped ring. The inner annular surface has two opposite recesses. One side of each of the recesses has a second bevel corresponding to the first bevel. The control ring is operated to rotate relative to the C-shaped ring between an unlocked position and a locked position. When the control ring is rotated to the unlocked position, the recesses correspond in position to the protrusions, the protrusions of the C-shaped ring extend into the recesses freely, and the press portions do not push the balls so that the tool head can be pivoted relative to the main body freely. When the control ring is rotated to the locked position, the protrusions are moved out of the recesses and pushed by the inner annular surface of the control ring, the C-shaped ring is deformed inwardly with the press portions to push the balls, and the balls are pressed against the annular grooves of the spherical seat to retain the tool head.

In an embodiment, the press portions are metal hard blocks embedded in the C-shaped ring.

In an embodiment, the fixing base is provided with a positioning slot, and the inner peripheral surface of the C-shaped ring is provided with a positioning block inserted into the positioning slot.

In an embodiment, the inner annular surface of the control ring is provided with a limiting groove, the outer peripheral surface of the C-shaped ring is provided with a limiting block extending into the limiting groove, and the limiting block leans against one end of the limiting groove when the control ring is rotated to the unlocked position or the locked position.

DETAILED DESCRIPTION OF THE PREFERRED EMBODIMENTS

Embodiments of the present invention will now be described, by way of example only, with reference to the accompanying drawings.

Figure 1:
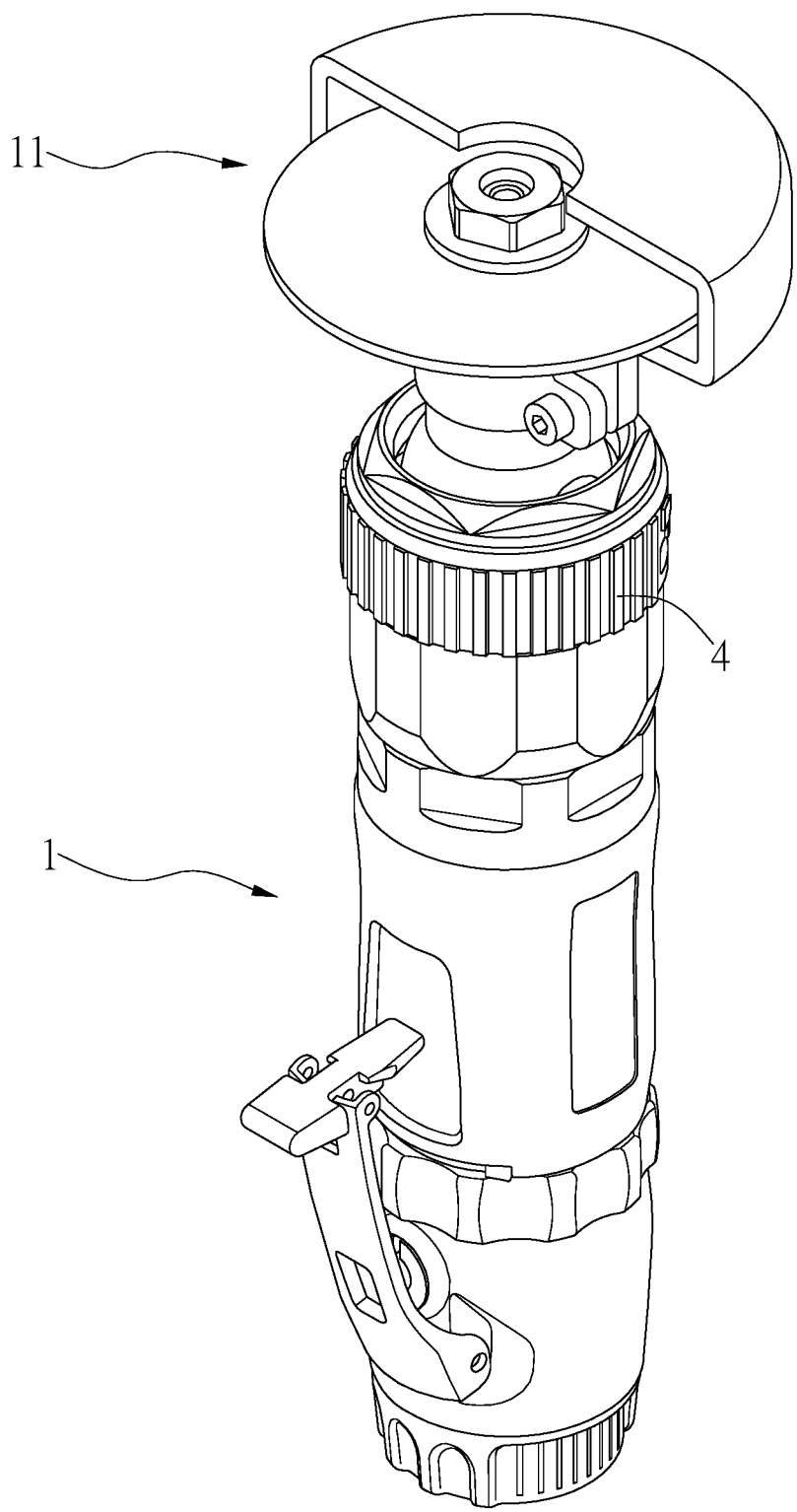
FIG. 1 is a perspective view of the present invention.
Figure 2:
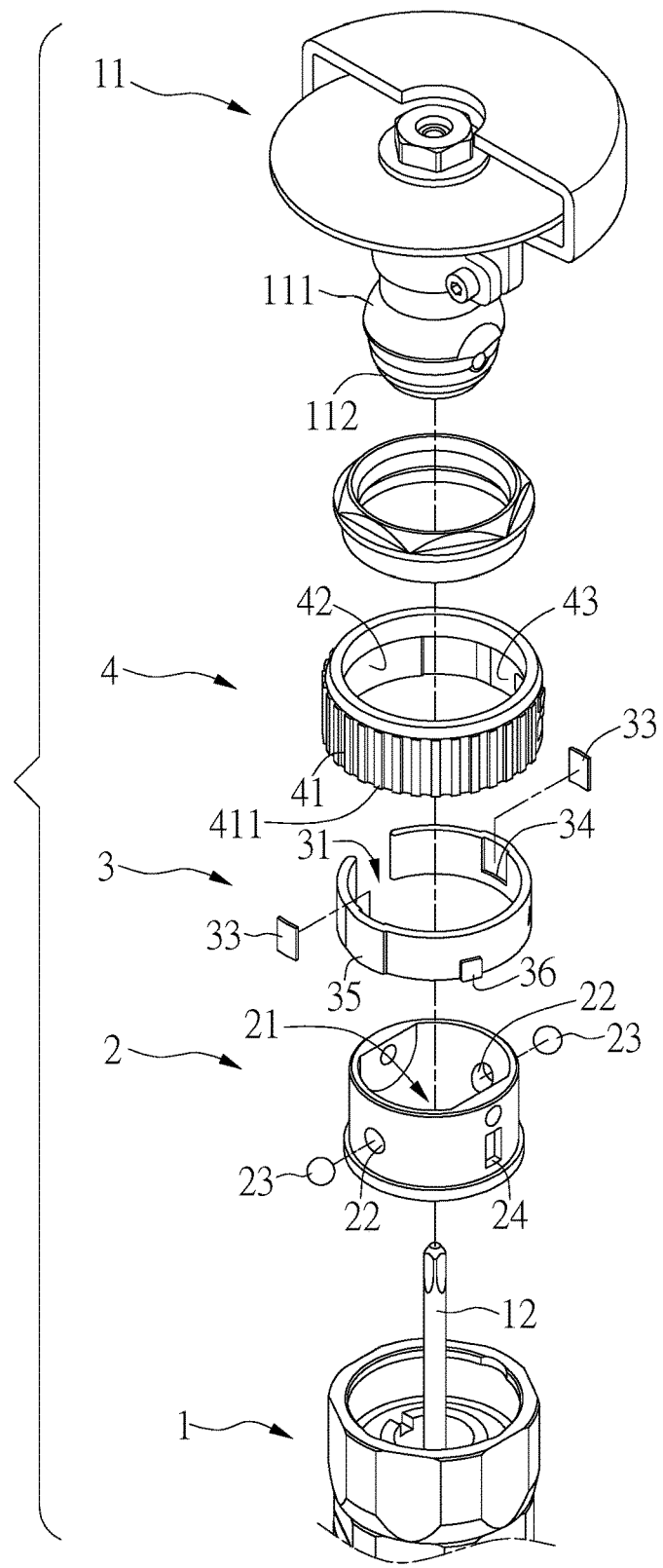
FIG. 2 is an exploded view of the present invention.

As shown in FIG. 1 and FIG. 2, the present invention discloses a joint fixing structure of a hand-held power tool. The hand-held power tool mainly has a main body 1 and a tool head 11. The main body 1 is connected to the tool head 11 through a transmission shaft 12. The transmission shaft 12 drives the tool head 11. The transmission shaft 12 has flexibility. The tool head 11 is pivotally connected to one end of the main body 1, so that the tool head 11 is pivotable relative to the main body 1 for adjusting the working angle. After the adjustment of the pivoting angle of the tool head 11 is completed, the tool head 11 is retained by the joint fixing structure of the present invention for subsequent work.

The present invention comprises a fixing base 2 embedded in the main body 1. The fixing base 2 has a receiving room 21 for receiving a spherical seat 111 of the tool head 11 and is connected to the transmission shaft 12. The spherical seat 111 is pivotable in the receiving room 21 and has a plurality of annular grooves 112 on its circumferential surface. Two opposite sides of the fixing base 2 are provided with through holes 22. Each of the through holes 22 is provided with a ball 23. The ball 23 in the through hole 22 is movable toward the inside of the fixing base 2 when subjected to the inward thrust from the outside of the fixing base 2.

A C-shaped ring 3 is disposed on the outer periphery of the fixing base 2. The C-shaped ring 3 has a notch 31. The fixing base 2 is provided with a positioning slot 24. The inner peripheral surface of the C-shaped ring 3 is provided with a positioning block 32 (see FIG. 3). The C-shaped ring 3 is connected to the fixing base 2 by the positioning block 32 engaged in the positioning slot 24. The C-shaped ring 3 covers the outer sides of the two through holes 22 and leans against the balls 23. The inner peripheral surface of the C-shaped ring 3 is provided with press portions 33 each corresponding in position to the ball 23. In this embodiment, the inner circumferential surface of the C-shaped ring 3 is provided with two engaging grooves 34. The press portions 33 are metal hard blocks engaged in the engaging grooves 34, thereby reducing wear between the C-shaped ring 3 and the ball 23.

Figure 3:
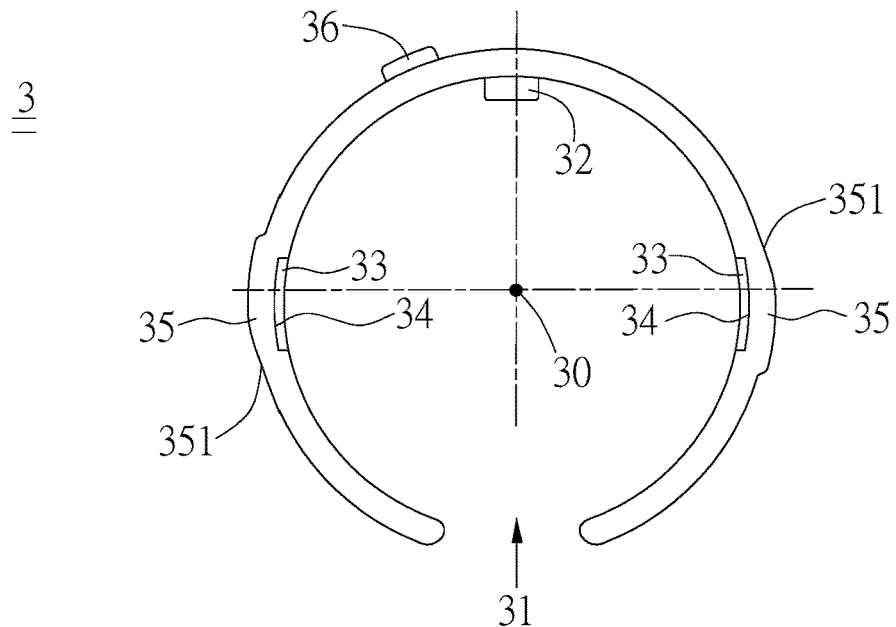
FIG. 3 is a top view of the C-shaped ring of the present invention.

The outer peripheral surface of the C-shaped ring 3 is provided with two protrusions 35. As shown in FIG. 3, the protrusions 35 correspond in position to the press portions 33, respectively. One side of each of the protrusions 35 has a first bevel 351. The two protrusions 35 are arranged symmetrically relative to a center 30 of the C-shaped ring 3.

Figure 4:
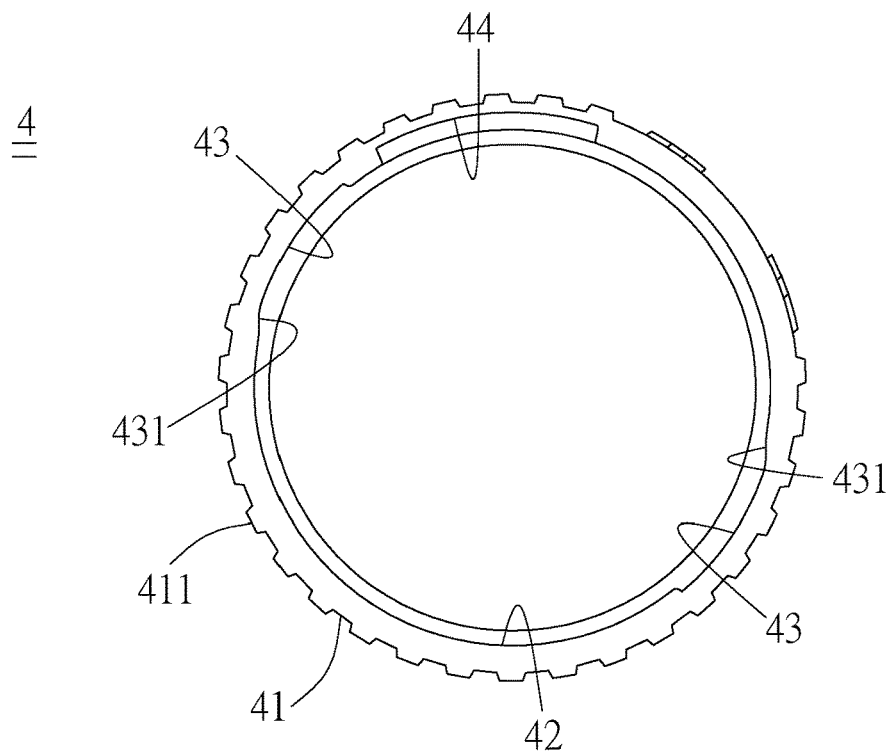
FIG. 4 is a top view of the control ring of the present invention.

Furthermore, a control ring 4 is disposed on the outer periphery of the C-shaped ring 3. The control ring 4 has an outer annular surface 41 in a circular shape. The outer annular surface 41 is provided with an anti-slip pattern 411. The control ring 4 has an inner annular surface 42 surrounding the outer peripheral surface of the C-shaped ring 3. As shown in FIG. 4, the inner annular surface 42 has two opposite recesses 43. One side of each of the recesses 43 has a second bevel 431. The second bevel 431 corresponds in shape to the first bevel 351.

Figure 5B:
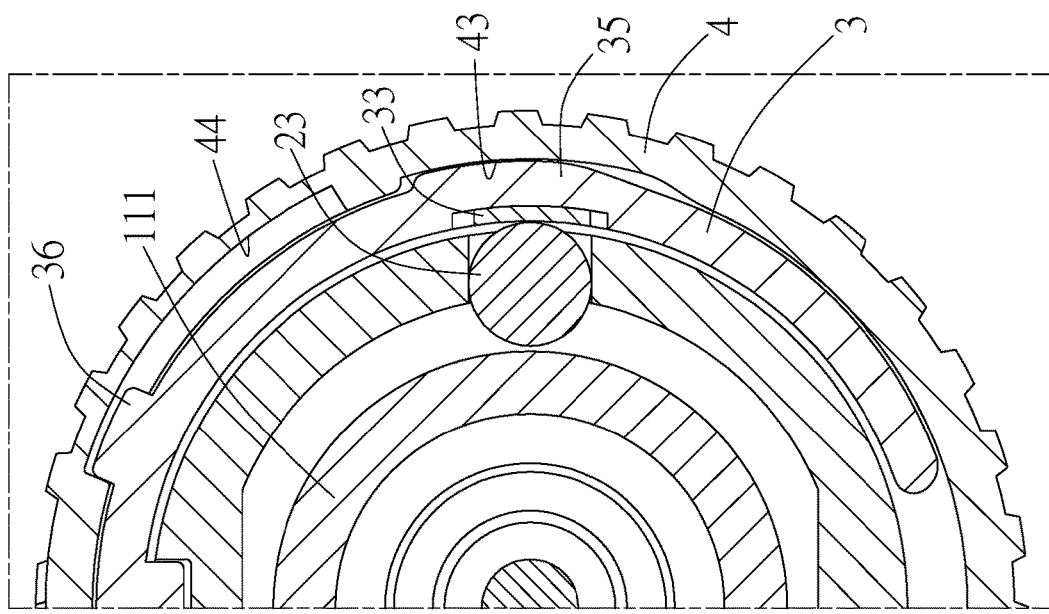
FIG. 5B is a partial enlarged view of FIG. 5A.
Figure 5A:
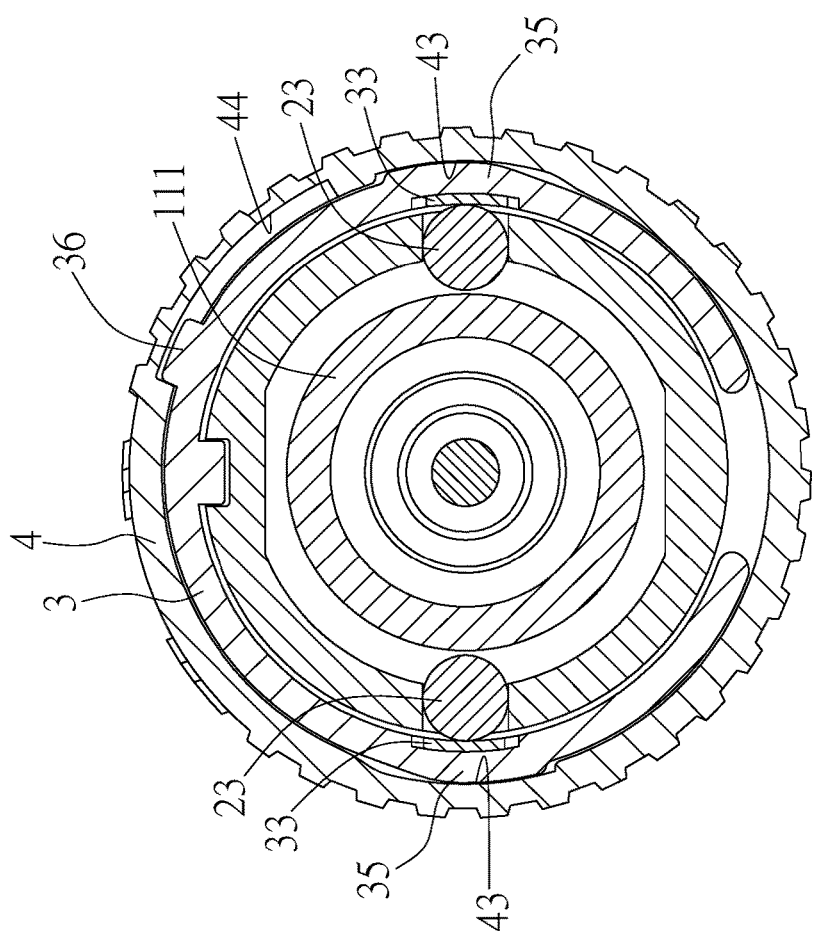
FIG. 5A is a cross-sectional view of the control ring located in the unlocked position of the present invention.

With the above structure, the control ring 4 can be operated to rotate relative to the C-shaped ring 3, thereby controlling the unlocking or locking of the pivoting position of the tool head 11. In detail, when the control ring 4 is rotated to an unlocked position as shown in FIG. 5A, the recesses 43 of the control ring 4 corresponds in position to the protrusions 35 of the C-shaped ring 3. At this time, referring to FIG. 5B, the C-shaped ring 3 is naturally opened, so that the protrusions 35 extend into the recesses 43. The press portions 33 do not push the balls 23 inward, so that the balls 23 are not pressed against the spherical seat 111. Thus, the tool head 11 can be pivoted relative to the main body 1 freely.

Figure 8:
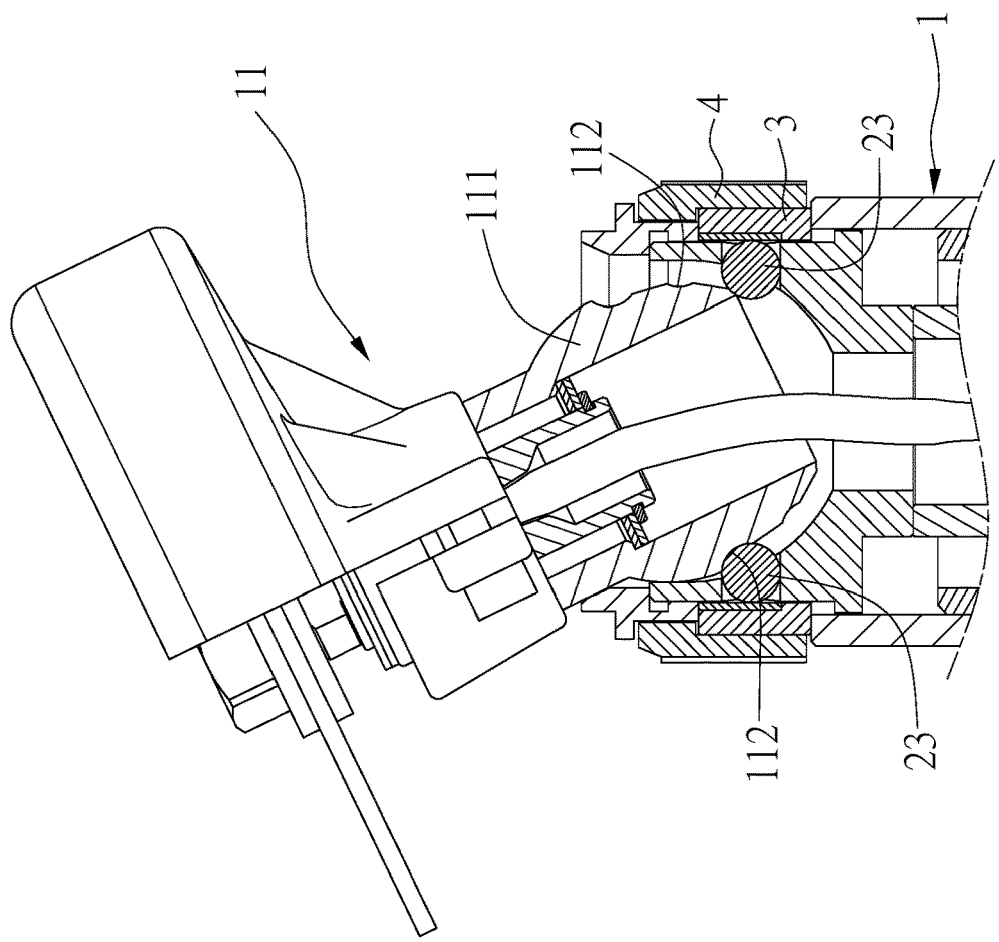
FIG. 8 is a cross-sectional view showing that the tool head of the present invention is held when in use.
Figure 6:
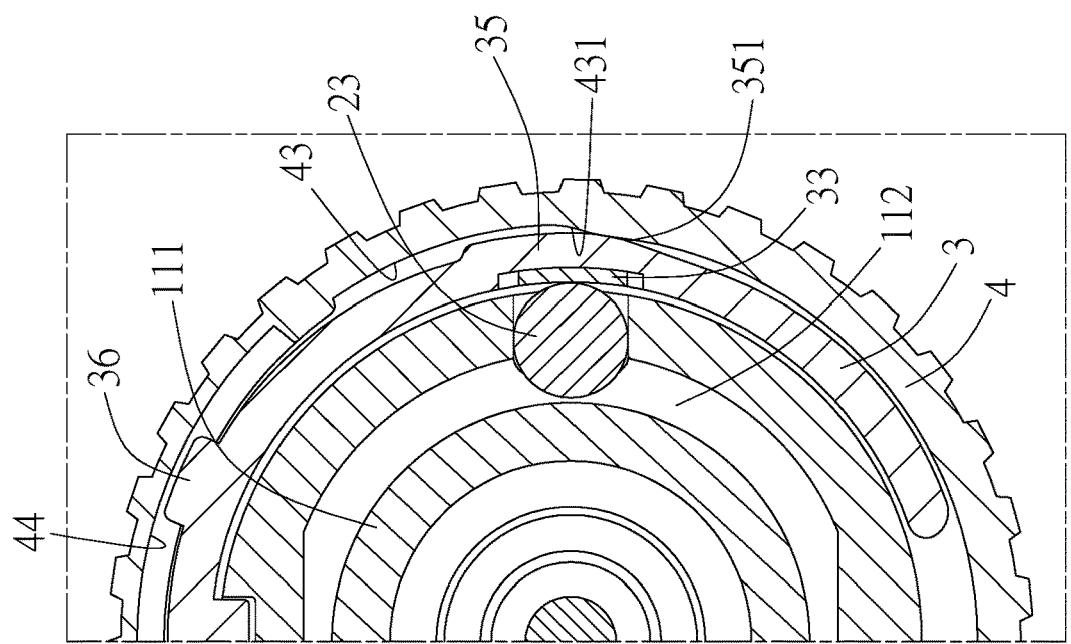
FIG. 6 is a partial enlarged view showing the operation of the control ring of the present invention.
Figure 7B:
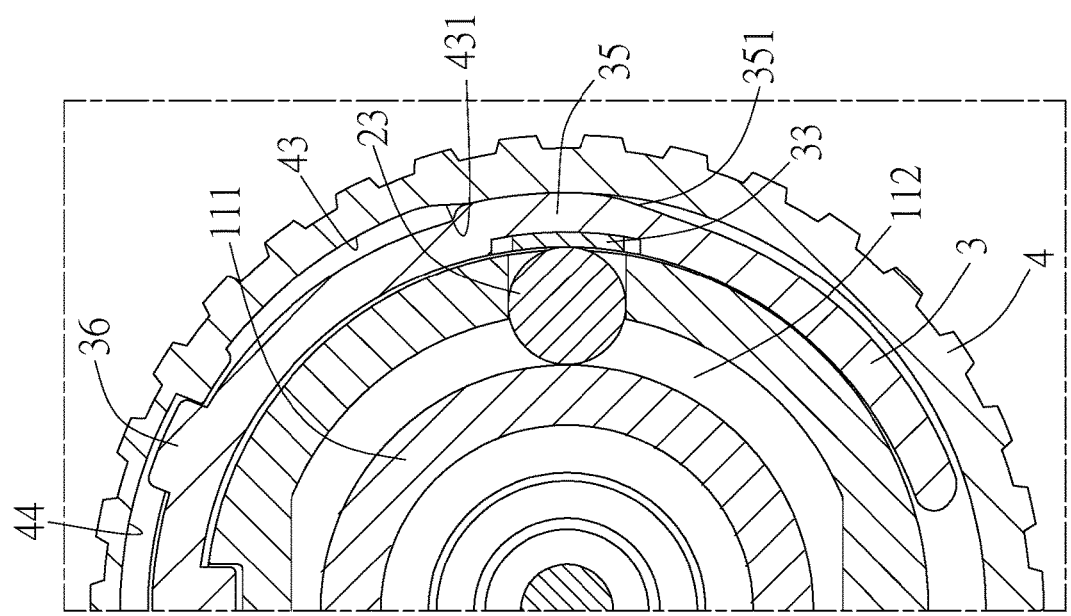
FIG. 7B is a partial enlarged view of FIG. 7A.
Figure 7A:
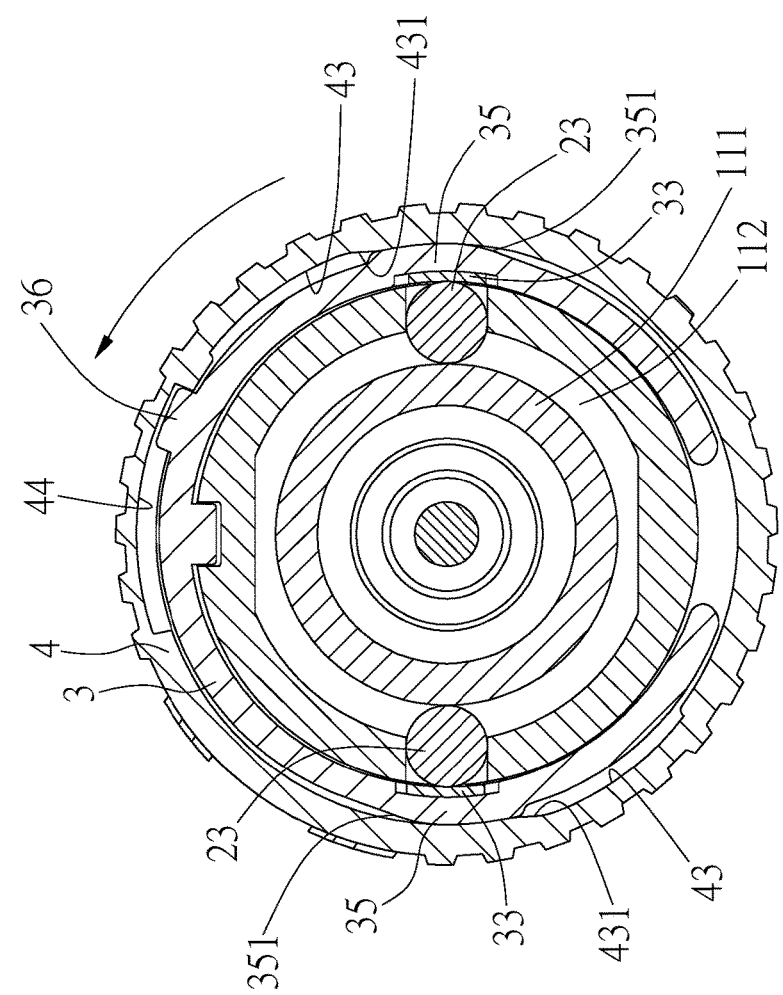
FIG. 7A is a cross-sectional view of the control ring located in the locked position of the present invention.
Figure 9:
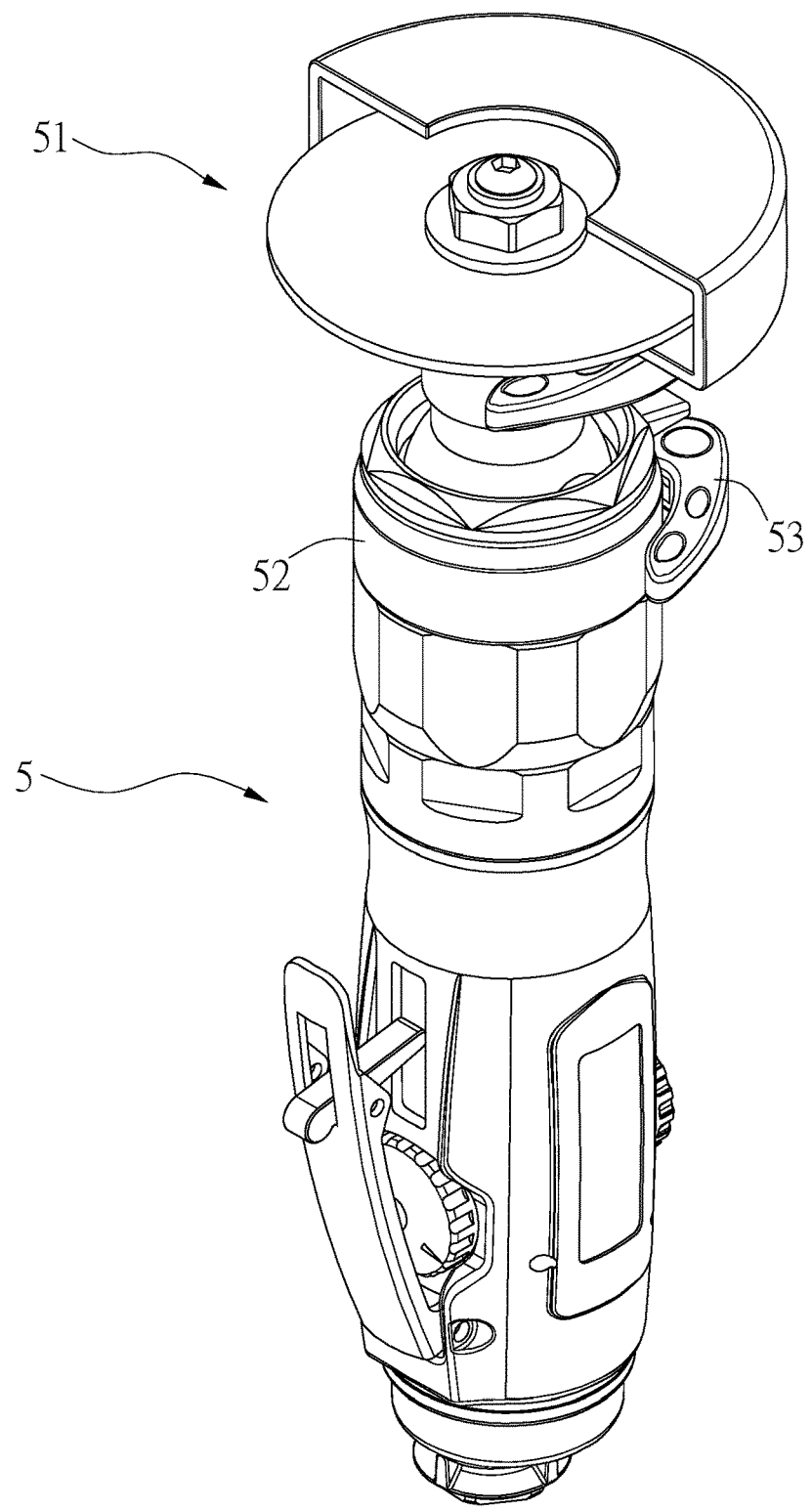
FIG. 9 is a perspective view of a conventional hand-held power tool.

In the process of rotating the control ring 4, as shown in FIG. 6, the first bevel 351 of the protrusion 35 and the second bevel 431 of the recess 43 are guided and pushed against each other. The recess 43 and the protrusion 35 are gradually staggered to a locked position, as shown in FIG. 7A. At this time, referring to FIG. 7B, the protrusion 35 is pushed by the inner annular surface 42 of the control ring 4 to deform the C-shaped ring 3 inwardly, and the press portion 33 is pushed inwardly against the ball 23. The ball 23 subjected to the thrust is pressed against the annular grooves 112 of the spherical seat 111, so that the pivoting angle of the tool head 11 is retained, as shown in FIG. 8. The pivoting angle of the tool head 11 is retained by the two balls 23, no longer being changed, for performing machining operations.

In this embodiment, as shown in FIG. 3 and FIG. 4, the inner annular surface 42 of the control ring 4 is provided with a limiting groove 44. The outer peripheral surface of the C-shaped ring 3 is provided with a limiting block 36. The limiting block 36 extends into the limiting groove 44, and the limiting block 36 can be moved in the limiting groove 44 with the rotation of the control ring 4. When the control ring 4 is rotated to the unlocked position or the locked position, as shown in FIGS. 5A and 7A, the limiting block 36 leans against one end of the limiting groove 44, thereby limiting the rotation of the control ring 4, without excessive operation.

Through the above description, it can be understood that the invention utilizes the rotation of the control ring 4 to switch the unlocking and locking of the pivoting position of the tool head 11. The user can operate it very easily, so it has a good operating feel. On the other hand, through the outer shape of the control ring 4, the present invention has a simple arcuate configuration as a whole, as shown in FIG. 1, and does not have a structure that protrudes outward, so that the appearance is simple and beautiful.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A joint fixing structure of a hand-held power tool, the hand-held power tool comprising a main body and a tool head, the main body being connected to the tool head through a flexible transmission shaft, the tool head being pivotable relative to the main body, the joint fixing structure comprising:
   a plurality of annular grooves, disposed on a spherical seat of the tool head;
   a fixing base embedded in the main body, the fixing base having a receiving room for receiving the spherical seat, the spherical seat being pivotable in the receiving room; two opposite sides of the fixing base being provided with through holes, the through holes being provided with balls movable in the through holes;
   a C-shaped ring, surrounding an outer periphery of the fixing base; an inner peripheral surface of the C-shaped ring being provided with press portions aligned in position to the balls; an outer peripheral surface of the C-shaped ring being provided with protrusions aligned in position to the press portions, one side of each of the protrusions having a first bevel, the protrusions being arranged symmetrically relative to a center of the C-shaped ring;
   a control ring, having an outer annular surface in a circular shape, the control ring having an inner annular surface surrounding the outer peripheral surface of the C-shaped ring; the inner annular surface having two opposite recesses, one side of each of the recesses having a second bevel associated with the first bevel;

the control ring being operated to rotate relative to the C-shaped ring between an unlocked position and a locked position; wherein when the control ring is rotated to the unlocked position, the recesses aligned in position to the protrusions, the protrusions of the C-shaped ring go into the recesses freely, and the press portions do not push the balls so that the tool head can be pivoted relative to the main body freely; wherein when the control ring is rotated to the locked position, the protrusions are moved out of the recesses and pushed by the inner annular surface of the control ring, the C-shaped ring is deformed inwardly with the press portions to push the balls, and the balls are pressed against the annular grooves of the spherical seat to retain the tool head.

2. The joint fixing structure of the hand-held power tool as claimed in claim 1, wherein the press portions are metal hard blocks embedded in the C-shaped ring.

3. The joint fixing structure of the hand-held power tool as claimed in claim 1, wherein the fixing base is provided with a positioning slot, and the inner peripheral surface of the C-shaped ring is provided with a positioning block inserted into the positioning slot.

4. The joint fixing structure of the hand-held power tool as claimed in claim 1, wherein the inner annular surface of the control ring is provided with a limiting groove, the outer peripheral surface of the C-shaped ring is provided with a limiting block extending into the limiting groove, and the limiting block leans against one end of the limiting groove when the control ring is rotated to the unlocked position or the locked position.

* * * * *